(12) United States Patent
Lewis et al.

(10) Patent No.: US 6,544,439 B1
(45) Date of Patent: Apr. 8, 2003

(54) LOW COKE FORMATION CATALYSTS AND PROCESS FOR REFORMING AND SYNTHESIS GAS PRODUCTION

(75) Inventors: Gregory J. Lewis, Mt. Prospect, IL (US); John E. Bauer, Lagrange Park, IL (US)

(73) Assignee: UOP LLC, Des Plaines, IL (US)

( * ) Notice: Subject to any disclaimer, the term of this patent is extended or adjusted under 35 U.S.C. 154(b) by 123 days.

(21) Appl. No.: 09/747,622

(22) Filed: Dec. 22, 2000

(51) Int. Cl.$^7$ ............................ C01B 3/26; B01J 27/198; B01J 27/185; B01J 23/755; B01J 23/847

(52) U.S. Cl. ................ 252/373; 502/174; 502/209; 502/213; 502/226; 502/227; 502/229; 502/302; 502/303; 502/328; 502/330; 502/335; 502/337

(58) Field of Search ................ 502/209, 213, 502/174, 226, 227, 229, 353, 354, 302, 303, 328, 330, 335, 337; 252/373

(56) References Cited

U.S. PATENT DOCUMENTS

| | | | |
|---|---|---|---|
| 3,595,808 A | | 7/1971 | Bertsch et al. ............... 252/437 |
| 3,917,732 A | * | 11/1975 | Vrieland et al. |
| 3,943,068 A | * | 3/1976 | Ripley |
| 5,292,246 A | | 3/1994 | Gateau et al. ............... 431/328 |
| 5,492,649 A | | 2/1996 | Christensen ................ 252/372 |
| 6,387,841 B1 | * | 5/2002 | Devlin et al. ............... 502/208 |

FOREIGN PATENT DOCUMENTS

CA 2153304 7/1995

OTHER PUBLICATIONS

"High Selective Conversion of Methane to Carbon Monoxide and the Effects of Chlorine Additives in the Gas and Solid Phases on the Oxidation of Methane on Strontium Hydroxyapatites" by Shigeru Sugiyama et al., *Ind. Eng. Chem. Res.* 1997 36, pp. 328–334. (no month).

Hydroxyapatite and Related Materials, by Paul W. Brown et al., CRC Press, Inc. 1994, pp. 45–72 (No month).

"Structure of Vanadate in Calcium Phosphate and Vanadate Apatite Solid Solutions" by Carlos Bauer Boechat et al., *Phys Chem. Chem. Phys.* 2000 2, pp. 4225–4230. (no month).

* cited by examiner

Primary Examiner—Wayne A. Langel
(74) Attorney, Agent, or Firm—John G. Tolomei; Frank S. Molinaro; Arthur E. Gooding (57) ABSTRACT

Applicants have developed a novel catalyst composition comprising a crystalline metal oxide having the empirical formula: $A_yB^{r+}{}_wNi_xD(G^{a-})_yO_z$, where A is an alkali metal (e.g. Na), B is a basic metal (e.g. Ca), D is a framework component (e.g. P), and G is an anionic species (e.g. OH$^-$). Nickel may be present in the framework of the crystalline metal oxide, dispersed thereon, or both. Preferably, the metal oxide component has an apatite or hydroxyapatite crystal structure. These crystalline metal oxide components have been found to have improved performance in partial oxidation and light hydrocarbon (e.g. methane) reforming to produce synthesis gas. A new process for synthesizing these metal oxides is also disclosed.

18 Claims, 1 Drawing Sheet

Spent Partial Oxidation Catalyst Carbon Analysis

♦ Catalyst of Example 11
■ Catalyst of Example 12
▲ Catalyst of Example 13
✕ Catalyst of Example 14
✕ Catalyst of Example 15
● Catalyst of Example 16 (Commercial Ni/Al2O3)
+ Catalyst of Example 17 (Commercial Ni/Al2O3 - MgO promoted)

LOW COKE FORMATION CATALYSTS AND PROCESS FOR REFORMING AND SYNTHESIS GAS PRODUCTION

FIELD OF THE INVENTION

The present invention relates to a novel catalyst composition comprising a crystalline metal oxide component, a method of making the composition, and a hydrocarbon conversion process using the composition. More specifically, the invention relates to a phosphate- or vanadate-based crystalline catalyst with nickel incorporated into the crystalline metal oxide framework, deposited thereon, or both. The catalyst is used for the production of synthesis gas from light hydrocarbons (e.g. methane).

BACKGROUND OF THE INVENTION

The combustion stoichiometry of methane gas at 1000° F. is highly exothermic and produces $CO_2$ and $H_2O$ according to the following reaction:

$$CH_4 + 2O_2 \rightarrow CO_2 + 2H_2O \quad (-190.3 \text{ kcal/g mol } CH_4)$$

The formed gases are not useful for the production of valuable chemical compounds, and the stability of these products complicates their conversion to more desirable products. Also, further processing is problematic due to the high temperatures generated in the combustion reaction, presenting problems with respect to downstream reactors and catalysts.

In contrast, useful gases, known as synthesis gases or syngases, are produced from the coversion of methane and light hydrocarbons to a mixture containing CO and $H_2$. Conventional syngas-generating processes include the gas phase partial oxidation process (U.S. Pat. No. 5,292,246), the autothermal reforming process (U.S. Pat. No. 5,492,649), and various other processes involving $CO_2$ or steam reforming. These reactions are all significantly less highly exothermic than combustion, and the choice of a particular route depends primarily on the desired product composition, as determined by its end use. Syngas is typically used to produce methanol, ammonia, or heavier hydrocarbon fuels through Fisher-Tropsch technology.

The partial oxidation of hydrocarbons can generally proceed according to several pathways, depending upon the relative proportions of the hydrocarbons and oxygen in the reaction mixture as well as the conditions used. In the case of methane, for example, the following reactions are possible:

$$2CH_4 + 2O_2 \rightarrow 2CO + 2H_2 + 2H_2O \quad (-64 \text{ kcal/g mol } CH_4)$$

$$2CH_4 + 1.5O_2 \rightarrow 2CO + 3H_2 + H_2O \quad (-34.9 \text{ kcal/g mol } CH_4)$$

or $$2CH_4 + O_2 \rightarrow 2CO + 4H_2 \quad (-5.7 \text{ kcal/g mol } CH_4)$$

The last reaction is the most desirable in terms of both the quality of the syngas produced and the minimization of liberated heat to protect the apparatus and catalyst bed from thermal damage. A further benefit of this pathway is a reduced formation of steam and corresponding increased yield of hydrogen and carbon monoxide. When combined with the reforming reaction, this reaction product provides a high quality syngas. Therefore, partial oxidation is usually optimal when the carbon to oxygen molar ratio (C:O ratio) in the feedstock gas mixture is maximized. Unfortunately, the improvements in product quality at high C:O ratios are largely offset by a greater tendency of coke formation reactions limiting the partial oxidation catalyst life. As a result, operation is normally constrained to C:O ratios that are lower than ideal for product quality purposes, but that provide reasonable catalyst stability. By lower product quality it is meant that downstream operational costs, such as those associated with recycling unconverted syngas, are increased.

In the autothermal reforming process, the methane and oxygen-containing feeds are mixed and reacted in a diffusion flame. The oxidized effluent is then typically passed into a steam reforming zone where the effluent is contacted with a conventional steam reforming catalyst. The catalyst may be present as a simple fixed bed or impregnated into a monolith carrier or ceramic foam. The high temperature in the catalytic reforming zone places great demands on the reforming catalyst in terms of its ability to substantially retain its catalytic activity and stability over many years of use. As in the partial oxidation process, catalyst coking problems associated with autothermal reforming normally require operation at sub-optimal conditions in terms of the feed stock composition and product quality. Specifically, the level of steam injection required to suppress coking is beyond that dictated solely by concerns about optimizing product quality and minimizing utility costs. In terms of the rate of catalyst coke formation, the molar $C:H_2O$ ratio for steam reforming is analogous to the C:O ratio used in partial oxidation. Higher values generally mean a greater coking tendency.

According to the autothermal steam reforming process of U.S. Pat. No. 5,492,649, the production of high amounts of carbon or soot in the diffusion flame oxidation step is avoided by mixing the methane gas with the oxidizer gas while swirling the latter at the injection nozzle to provide a large number of mixing points in the diffusion flame. However, this process still causes partial oxidation in the diffusion flame, resulting in over-oxidation and an excessively high temperature effluent. The heat generated can damage the steam reforming catalyst as well as the face of the injector. Published Canadian Patent Application No. 2,153,304 teaches that the formation of soot is avoided or reduced by actually reducing the steam to carbon molar feed ratio, combined with increasing the steam reforming temperature to between 1100–1300° C., and/or introducing the gaseous hydrocarbon feed in increments.

The prior art dealing with partial oxidation and reforming is concerned with overcoming undesired side reactions that lead to the formation of catalyst coke. However, the methods employed have largely been confined to process adjustments, such as those discussed in Canadian Patent Application 2,153,304. As mentioned previously, however, the manipulation of reaction compositions and conditions often restrains partial oxidation and reforming operations to the extent that product quality suffers and/or larger equipment and utilities are imposed.

In terms of adjusting catalyst properties to limit coke formation under a wide range of conditions, it is well known that the use of noble metals (e.g. Pt) provides a solution. However, noble metal-containing catalysts are generally cost prohibitive for industrial applications. Instead, catalysts used in the various types of steam reforming processes normally contain a metal component selected from uranium, Group VII metals, and Group VIII metals. These metals may be combined or used with other metals such as lanthanum and cerium. Generally, the metals are supported on thermally stable inorganic refractory oxides. Preferred catalyst metals are the Group VIII metals, particularly nickel. In the case of nickel, essentially any nickel-containing material has been found useful, e.g. nickel supported on alpha-alumina, nickel aluminate materials, nickel oxide. Preferably, supported nickel-containing materials are used.

Support materials include alpha-alumina, aluminosilicates, cement, and magnesia. Alumina materials, particularly fused tabular alumina, are particularly useful as catalyst support. Preferred catalyst supports may be Group II metal oxides, rare earth oxides, alpha-alumina, modified alpha-aluminas, alpha-alumina-containing oxides, hexa-aluminates, calcium aluminate, or magnesium-alumina spinel. In some cases, catalysts are stabilized by addition of a binder, for example, calcium aluminum oxide. It is preferred to maintain a very low level of silicon dioxide in the catalyst, e.g. less than 0.3 wt-% to avoid volatilization and fouling of downstream equipment. The shape of the catalyst carrier particles may vary considerably. Raschig rings 16 mm in diameter and height, and having a single 6–8 mm hole in the middle, are well known in the art. Other physical forms, such as saddles, stars, beads, and spoked wheels are commercially available.

Catalysts comprising calcium nickel phosphates used in dehydrogenation applications are disclosed in U.S. Pat. No. 3,595,808, where a crystalline hydroxyapatite phase has been known to result from the preparation of such catalysts. This phase is described as a hydroxyapatite in which 1 of every 6 to 12 calcium atoms is replaced by nickel. Apatite structures, having the general chemical formula $A_{10}(BO_4)_6 X_2$ where A=Ca, Sr, Ba, Pb, Cd and other rare earth elements, $BO_4=PO_4^{3-}$, $VO_4^{3-}$, $SiO_4^{4-}$, $AsO_4^{3-}$, $CO_3^{2-}$, and X is $OH^-$, $Cl^-$, $F^-$, $CO_3^{2-}$, are more thoroughly discussed and described with reference to their synthesis and physical properties by Brown & Constantz, *Hydroxyapatite and Related Materials*, CRC Press, Inc. (1994).

The preparation and structural characterization of calcium-phosphate and vanadate solid solutions are described by Boechat, Eon, Rossi, Perez, and Gil, *Phys. Chem. Chem. Phys.*, 2000, 2, 4225–4230, with reference to the incorporation of Sr into the composition to yield $Ca_{10-x}Sr_x(PO_4)_{6-s}(VO_4)_s(OH)_2$ apatite structures. Finally, the conversion of methane to carbon monoxide in the presence of stoichiometric strontium hydroxyapatite is reported by Sugiyama, Minami, Higaki, Hayahi, and Moffat, *Ind. Eng. Chem. Res.* 1997, 36, 328–334.

In contrast, applicants have unexpectedly found that the problem of coke formation associated with conventional oxidation and reforming catalysts can be significantly mitigated through the use of a novel catalyst comprising a crystalline metal oxide component having a basic metal (e.g. Sr) and a structural component (e.g. $PO_4$ or $VO_4$), and optionally an alkali metal within the crystalline framework. Active nickel is also included in the framework, dispersed on the crystalline metal oxide component, or both. As a result of the reduced coke formation in hydrocarbon oxidation and reforming operations using the catalyst of the present invention, many of the problems noted above relating to operational constraints and the associated cost burdens are overcome.

SUMMARY OF THE INVENTION

In one embodiment, the present invention is a catalyst composition for the production of synthesis gas from light hydrocarbons, the catalyst composition comprising a crystalline metal oxide component having a chemical composition on an anhydrous basis expressed by an empirical formula of:

where A is an alkali metal selected from the group consisting of $Li^+$, $Na^+$, $K^+$, $Rb^+$, $Cs^+$, and mixtures thereof, "v" is the mole ratio of A to D and varies from 0 to about 2, B is a basic metal, "w" is the mole ratio of B to D and varies from about 1 to about 3, "t" is the weighted average valence of B and varies from 2 to about 3, "x" is the mole ratio of Ni to D and varies from 0 to about 0.5, D is a framework component selected from the group consisting of $P^{+5}$, $V^{+5}$, and mixtures thereof, and G is an anionic species selected from the group consisting of $OH^-$, $Cl^-$, $F^-$, $CO_3^{2-}$, and mixtures thereof, "u" is the average valence of G and varies from 1 to about 2, "y" is the mole ratio of G to D and varies from 0 to about 2, and "z" is the mole ratio of O to D and has a value determined by the equation:

$$z=\tfrac{1}{2}(v+t\cdot w+2\cdot x+5-u\cdot y),$$

and when B is Ca, "v" is not 0, and when "x" is 0, the catalyst composition further comprises a nickel component dispersed on the crystalline metal oxide component.

In a preferred embodiment, the present invention is a catalyst as described above where the crystalline metal component has the hydroxyapatite crystal structure.

In another embodiment, the present invention is a process for preparing a catalyst composition comprising a crystalline metal oxide component having a chemical composition on an anhydrous basis expressed by an empirical formula of:

where A is an alkali metal selected from the group consisting of $Li^+$, $Na^+$, $K^+$, $Rb^+$, $Cs^+$, and mixtures thereof, "v" is the mole ratio of A to D and varies from 0 to about 2, B is a basic metal, "w" is the mole ratio of B to D and varies from about 1 to about 3, "t" is the weighted average valence of B and varies from 2 to about 3, "x" is the mole ratio of Ni to D and varies from 0 to about 0.5, D is a framework component selected from the group consisting of $P^{+5}$, $V^{+5}$, and mixtures thereof, and G is an anionic species selected from the group consisting of $OH^-$, $Cl^-$, $F^-$, $CO_3^{2-}$, and mixtures thereof, "u" is the average valence of G and varies from 1 to about 2, "y" is the mole ratio of G to D and varies from 0 to about 2, and "z" is the mole ratio of O to D and has a value determined by the equation:

$$z=\tfrac{1}{2}(v+t\cdot w+2\cdot x+5-u\cdot y),$$

and when B is Ca, "v" is not 0, and when "x" is 0, the catalyst composition further comprises a nickel component dispersed on the crystalline metal oxide component, the process comprising:

a) reacting a mixture containing reactive sources of B basic metal, optionally Ni, D framework component, and optionally A alkali metal, at a pH from about 8 to about 14 and a temperature and time sufficient to form the crystalline metal oxide component, the mixture having a composition expressed by:

where N is a mineralizer, "h" varies from 0 to about 10, "j" varies from about 0.10 to about 6.0, "k" varies from 0 to about 1.0, "l" varies from 0 to about 20, and "m" varies from about 40 to about 500, b) contacting, when "k" is 0, the crystalline metal oxide component with an aqueous solution of a nickel salt selected from the group consisting of nickel nitrate, nickel chloride, nickel bromide, nickel acetate, and mixtures thereof, and c) calcining the crystalline metal oxide component of step (a) or (b) at a temperature from about 600° C. to about 1000° C. for a period from about 1 to about 10 hours to yield the catalyst.

In yet another embodiment, the present invention is a process for producing synthesis gas comprising reacting a light hydrocarbon and an oxidant at reaction conditions in the presence of a catalyst composition comprising a crystalline metal oxide component having a chemical composition on an anhydrous basis expressed by an empirical formula of:

$$A_v B^{t+}_w Ni_x D(G^{u-})_y O_z$$

where A is an alkali metal selected from the group consisting of $Li^+$, $Na^+$, $K^+$, $Rb^+$, $Cs^+$, and mixtures thereof, "v" is the mole ratio of A to D and varies from 0 to about 2, B is a basic metal, "w" is the mole ratio of B to D and varies from about 1 to about 3, "t" is the weighted average valence of B and varies from 2 to about 3, "x" is the mole ratio of Ni to D and varies from 0 to about 0.5, D is a framework component selected from the group consisting of $P^{+5}$, $V^{+5}$, and mixtures thereof, and G is an anionic species selected from the group consisting of $OH^-$, $Cl^-$, $F^-$, $CO_3^{2-}$, and mixtures thereof, "u" is the average valence of G and varies from 1 to about 2, "y" is the mole ratio of G to D and varies from 0 to about 2, and "z" is the mole ratio of O to D and has a value determined by the equation:

$$z=\tfrac{1}{2}(v+t\cdot w+2\cdot x+5-u\cdot y),$$

and when B is Ca, "v" is not 0, and when "x" is 0, the catalyst composition further comprises a nickel component dispersed on the crystalline metal oxide component.

These and other embodiments and objects will become clearer after the detailed description of the invention.

BRIEF DESCRIPTION OF THE DRAWING

The FIGURE provides spent catalyst coke levels of catalyst of the present invention compared to conventional catalysts. Each data point represents the measured weight percentage of catalyst carbon, after testing in methane partial oxidation service for 48 hours. Details of the testing procedure are provided in Examples 11–17.

DETAILED DESCRIPTION OF THE INVENTION

As stated, the present invention relates to a catalyst composition comprising a crystalline metal oxide component, a process for preparing the catalyst composition, and a process for producing synthesis gas using the catalyst composition. The crystalline metal oxide component of the composition has a chemical composition on an anhydrous basis expressed by an empirical formula of:

$$A_v (B^{t+})_w Ni_x D(G^{u-})_y O_z$$

where A is an alkali metal selected from the group consisting of $Li^+$, $Na^+$, $K^+$, $Rb^+$, $Cs^+$, and mixtures thereof, "v" is the mole ratio of A to D and varies from 0 to about 2, B is a basic metal, "w" is the mole ratio of B to D and varies from about 1 to about 3, "t" is the weighted average valence of B and varies from 2 to about 3, "x" is the mole ratio of Ni to D and varies from 0 to about 0.5, D is a framework component selected from the group consisting of $P^{+5}$, $V^{+5}$, and mixtures thereof, and G is an anionic species selected from the group consisting of $OH^-$, $Cl^-$, $F^-$, $CO_3^{2-}$, and mixtures thereof, "u" is the average valence of G and varies from 1 to about 2, "y" is the mole ratio of G to D and varies from 0 to about 2, and "z" is the mole ratio of O to D and has a value determined by the equation:

$$z=\tfrac{1}{2}(v+t\cdot w+2\cdot x+5-u\cdot y),$$

and "v" is not 0 when B is Ca.

The basic metal B is typically a metal with a rather large cationic radius, generally from about 0.85 Å to about 1.40 Å, and a cationic charge of +2 or +3. These metals are broadly found in the alkaline earth series, rare earth series, and in selected cases in both the transition metal series, such as $Cd^{2+}$ and $Hg^{2+}$, and the main group metals such as $Pb^{2+}$. Preferably, B is selected from the group consisting of $Ca^{2+}$, $Sr^{2+}$, $Cd^{2+}$, $Pb^{2+}$, $Ba^{2+}$, $La^{3+}$, $Eu^{3+}$, $Gd^{3+}$, $Pr^{3+}$, $Nd^{3+}$, $Sm^{3+}$, $Y^{3+}$, $Yb^{3+}$, and mixtures thereof. Catalysts give exceptional results when B is a mixture of Sr and another metal selected from this group of basic metals.

When B is one basic metal, the weighted average valence of B is the valence of the one metal. However, when more than one basic metal is used, the total amount of $$B_w^{t+}=B_i^{ti+}B_j^{tj+}+B_k^{tk+}+\ldots$$

and the weighted average valance "t" is defined by $$t=\frac{t_i \cdot i + t_j \cdot j + t_k \cdot k + \ldots}{w}$$

The weighted average valence of the anionic species ("u") is measured in a similar manner and is dependent on the amount of $CO_3^{2-}$ present in the composition, relative to the other possibilities for G, that have a oxidation state of −1. Thus, if the total amount of G, or "y" is defined by y=p+q, where "p" is the mole ratio of $CO_3^{2-}$, and "q" is the mole ratio of species having a valence of −1, then the average valence is $$u=\frac{-2p-q}{p+q}$$

The crystalline metal oxide component of the catalyst is prepared by dissolving sources of Ni (if incorporated into the framework) and the basic metals in a first solution. Sources of the framework component and optionally the alkali metal are dissolved in a second solution. The two solutions are mixed thoroughly to form the reaction mixture. Optionally at this time a mineralizer may be added. After thorough homogenization, the reaction mixture is digested from about 2 hours to about 7 days at temperatures from about 20° C. to about 200° C. Preferably, a hydrothermal digestion is used at a temperature of 50° C. to 150° C. for a period of 12 to 96 hours. More preferably, the temperature is from about 75° C. to about 125° C. for a period from about 24 to about 48 hours. Prior to digestion, the pH of the reaction mixture is generally from about 8.0 to about 14.0 and is controlled by the amount of alkali hydroxide or mineralizer added to the reaction mixture. After digestion, the product is isolated by filtration or centrifugation, washed with de-ionized water and dried at room temperature or in an oven up to 200° C. The dried product is then calcined at a temperature from about 600° C. to about 1000° C. for about 1 to about 10 hours under a flow of air. The sample can then optionally be screened or adjusted in size prior to use.

Generally, after the initial hydrothermal synthesis, the crystalline metal oxide component exhibits the hydroxyapatite structure as determined by x-ray diffraction. On occasion, the product of the hydrothermal synthesis may also include some $Ni(OH)_2$, but this is usually not the case. Calcination of the isolated hydroxyapatites from the hydrothermal syntheses can result in multiple phases forming in the final catalyst, depending on calcination conditions. It is observed that along with the hydroxyapatite some NiO can form outside of the framework or another phase such as $Sr_3(PO_4)_2$ will appear. In certain instances a new structure can form after calcination (e.g. Example 8 for SrCaP-1). Hence, the crystalline metal component may contain multiple crystalline phases.

In forming the reaction mixtures above, sources of the alkali metal may include without limitation hydroxides, acetates, halides, or carbonates of sodium, potassium, lithium, rubidium, or cesium. Sources of the basic metals may include nitrates, chlorides, and acetates of calcium, strontium, lead, cadmium, barium, lanthanum, neodymium, gadolinium, europium, yttrium, ytterbium, and samarium. Sources of nickel include nickel nitrate, nickel chloride, and nickel acetate. Mineralizing agents such as hydroxide, fluoride, chloride, or carbonate may be introduced for example as the alkali salt, such as sodium fluoride or sodium carbonate, organoammonium salts such as tetramethylammonium hydroxide or tetraethylammonium fluoride or in the case of the halides as acids such as HF or HCl. The framework species P and V are introduced to the reaction mixture via sources such as phosphoric acid, $Na_2HPO_4$, $Na_3PO_4$, $Na_3VO_4$, $KVO_3$, and $V_2O_5$.

Overall, the reaction mixture has a composition expressed by:

$$hA_2O:jBO_{1/2}:kNiO:D_2O_5:lN:mH_2O$$

where N is a mineralizer, "h" varies from 0 to about 10, "j" varies from about 0.10 to about 6.0, "k" varies from 0 to about 1.0, "l" varies from 0 to about 20, and "m" varies from about 40 to about 500. When "k" is 0, nickel is dispersed onto the crystalline metal oxide component (which contains no nickel within its crystalline framework) prior to calcination.

The structure of the crystalline metal oxide component of this invention was determined by x-ray analysis. The x-ray patterns presented in the following examples were obtained using standard x-ray powder diffraction techniques. The radiation source was a high-intensity, x-ray tube operated at 45 kV and 35 ma. The diffraction pattern from the to copper K-alpha radiation was obtained by appropriate computer based techniques. Flat compressed powder samples were continuously scanned at 2° (2θ) per minute from 2° to 70° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

Alternatively, the x-ray patterns were obtained from the copper K-alpha radiation by use of computer based techniques using a Siemens D-500 x-ray powder diffractometer, Siemens Type K-805 x-ray sources, available from Siemens Corporation, Cherry Hill, N.J., with appropriate computer interface.

As is understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from other compositions. In some of the x-ray patterns reported, the relative intensities of the d-spacings are indicated by the notations vs, s, m, and w which represent very strong, strong, medium, and weak, respectively. In terms of 100×I/$I_o$, the above designations are defined as $$w=0–15; m=15–60; s=60–80 \text{ and } vs=80–100.$$

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

To allow for ready reference, the different structure types in the following examples have been given arbitrary numbers such as CaSrNiP-1. Thus CaSrNiP-1 and KCaSrNiP-1 have the same structure, i.e., structure type 1. The elements in the name are indicative of the composition. One particular structure is the hydroxyapatite structure, designated—HA. Both the apatite and hydroxyapatite structures are preferred for the crystalline metal oxide component used in the catalyst of the present invention. These structures are further defined, with reference to atomic positions, by Kikuchi, Masanori; Yamazaki, Atsushi; Otsuka, Ryohei; Akao, Masaru; Aoki, Hideki. *Crystal structure of Sr-substituted hydroxyapatite synthesized by hydrothermal method.* J. Solid State Chem. (1994), 113(2), 373–8.

Depending on the specific application for which the catalyst of the present invention is intended, incorporation of nickel within the framework of the crystalline metal oxide component may provide sufficient activity without further treatment. Alternatively, the crystalline metal oxide may be synthesized without framework nickel, thus requiring the addition of a nickel component (e.g. Ni or NiO) for catalytic activity. It may also be desirable to disperse a nickel component onto the surface of the crystalline metal oxide that also has nickel incorporated into its framework. When a nickel component is dispersed onto the crystalline metal oxide, this is performed prior to the calcination step.

The nickel component may be deposited, if desired, onto the crystalline metal oxide in any suitable manner known in the art that results in a uniform dispersion. Usually the nickel component is deposited by contacting (e.g. impregnating) the crystalline metal oxide component with an aqueous solution of a nickel salt selected from the group consisting of nickel nitrate, nickel chloride, nickel bromide, nickel acetate, etc. Contacting may be effected by conventional means known in the art such as dipping, spraying, etc. Those skilled in the art are cognizant of the contacting conditions (e.g. time, temperature, and solution concentration) required to achieve a desired loading of dispersed nickel component.

A preferred method of depositing a nickel component involves the use of a steam-jacketed rotary dryer to achieve evaporative impregnation. The crystalline metal oxide component particles are immersed in an impregnating solution of any of the previously mentioned salt solutions, where the slurry of metal oxide component and nickel solution are contained in the dryer. The crystalline metal oxide component is tumbled therein by rotation of the dryer, and evaporation of the impregnation solution in contact with the tumbling crystalline metal oxide is expedited through the application of steam to the dryer jacket.

After impregnation is complete, the resulting nickel containing crystalline metal oxide particles are dried at a temperature from about 20° C. to about 250° C. for a time from about 1 to about 48 hours. The crystalline metal oxide, now having a nickel component dispersed thereon, is then calcined according to the technique outlined above. In general, the calcination converts the nickel component, in whatever form it was deposited, to substantially nickel oxide.

In addition to the catalytic component, it is within the scope of the invention to deposit other metals, such as catalyst promoter metals, simultaneously or sequentially onto the crystalline metal oxide component. This addition of a promoter metal is accomplished in substantially the same manner as the procedure described above for contacting the crystalline metal oxide component with a nickel solution. Promoter metals that may be used to enhance activity and/or selectivity include lanthanum and cerium.

The catalyst of the present invention may be used in the various syngas generating processes described previously. These processes comprise contacting a light hydrocarbon and an oxidant under effective conditions and in the presence of the crystalline metal oxide catalyst. Light hydrocarbons are preferably the $C_1$–$C_4$ paraffins, namely methane, ethane, propane, and butane. Natural gas, an impure mixture of methane and other components, is also a preferred feed to the process due to its ready availability. Olefins and other unsaturates may also be used but tend to form polymers and other undesirable side products. Preferred oxidants are oxygen, when used for partial oxidation, and steam, when applied to steam reforming. Oxygen may be incorporated into the reaction mixture in its pure form, but more commonly it is introduced as air or enriched air in order to overcome problems associated with creating explosive mixtures. Air is also the most convenient source. The use carbon dioxide as an oxidant is known in $CO_2$ reforming.

Specific processes that are improved using the crystalline metal oxide catalyst of the present invention include partial oxidation, steam reforming, autothermal reforming, and $CO_2$ reforming. The conditions for these syngas-generating processes are known and are described, for example, in U.S. Pat. No. 5,292,246 with respect to partial oxidation and in U.S. Pat. No. 5,492,649 with respect to autothermal reforming. In general, these reactions are performed at a temperature from about 600° C. to about 1200° C., an absolute pressure from about 5 to about 60 atmospheres, and a gas hourly space velocity (GHSV) from about 500 to about 500,000 hr−1. As is understood in the art, the GHSV is the volumetric hourly gas flow rate of the total feed components divided by the catalyst bed volume.

A distinguishing feature of the catalyst of the present invention is its reduced coke formation tendency when applied to any of the above processes. Without being bound to a particular theory, it is believed that the incorporation of nickel into the framework structure of the crystalline metal oxide provides a degree of dispersion previously unknown in the art. Conventional surface-impregnated catalytic metals, even when well dispersed initially, are prone to migration and agglomeration under the severe conditions of reforming. The resulting agglomerated metal sites can initiate the growth of both filamentous and layered carbon. In contrast, by attempting to incorporate nickel uniformly into the framework of the catalyst of the present invention during the initial synthesis, the high initial dispersion and strong interactions are believed to prevent the migration and massive agglomeration of nickel that are characteristic of conventional catalysts. Overall, sites for the nucleation of carbon growth are substantially diminished through the use of catalysts of the present invention.

The benefits attributed to the use of the catalyst of the present invention include a relaxation of the requirement for excess oxygen or steam injection to suppress coking in partial oxidation and reforming reactions. By excess oxygen or steam is meant an amount beyond the stoichiometric requirements for the reaction or beyond that which leads to the optimal syngas composition. In the case of partial oxidation, steam is often required as a diluent, although not a reactant, primarily to inhibit the formation of catalyst coke. This is currently a primary reason for the commercial domination of steam reforming over partial oxidation for syngas production.

For partial oxidation, the catalyst coking tendency under a given set of conditions is closely related to the atomic carbon to oxygen atom ratio (C:O ratio) in the reaction mixture. Conventional catalysts typically show a substantial rate of coking at a C:O ratio of greater than 0.5 (i.e. a $CH_4$:$O_2$ ratio of greater than 1). In contrast, catalysts of the present invention have been used in partial oxidation processes with minimal coking at C:O ratios in a preferred range from about 0.5 to about 2.0. While the catalyst of the present invention provides a reduced coking tendency in dry partial oxidation processes, the ability to lower the injection rate of steam as a coke inhibitor benefits steam reforming as well. Analogous to partial oxidation, the measure for catalyst coking tendency in stream reforming is generally the C:$H_2O$ ratio, or carbon to steam molar ratio. In a preferred embodiment, when the catalyst is used for steam reforming, the reaction conditions include a carbon to steam molar ratio of greater than about 2.0. The advantages may be manifested in a longer catalyst life and/or a reduction in utility costs (e.g. compression), heating duties, and raw material consumption as a result of operating under higher severity (e.g., higher C:O ratios).

In order to more fully illustrate the variety of species to be derived from the present invention, the following examples are set forth. It is to be understood that the examples are only by way of illustration and are not intended as an undue limitation on the broad scope of the invention as set forth in the appended claims.

EXAMPLES

Example 1

Preparation of Na—Ni—Sr—P—O

A 159 gram portion of 85% phosphoric acid ($H_3PO_4$) was added to 200 grams of de-ionized water in a glass beaker. The resulting solution was placed in an ice bath. Similarly, 220.8 grams of NaOH was dissolved in 300 grams of de-ionized water and chilled in an ice bath. While these solutions chilled, a third solution was prepared by dissolving 131.4 grams of Sr($NO_3$)$_2$ and 20.0 grams of Ni($NO_3$)$_2$.6 $H_2O$ in 331.4 grams of de-ionized water. The chilled NaOH solution was slowly added to the $H_3PO_4$ solution with stirring and the resulting mixture was transferred to a 2-liter plastic beaker which was placed under a high speed stirrer. With vigorous mixing, the Sr/Ni solution was added to the phosphate solution forming a gelatinous precipitate. The reaction mixture was homogenized for an hour and then transferred to two 1-liter teflon bottles which were thereafter digested at 100° C. for 4 days at autogenous pressure. The solid products were isolated by filtration, washed thoroughly with de-ionized water, and dried at room temperature. The solid was then calcined at 800° C. for 1.5 hours.

Elemental analysis showed the catalyst to have the empirical formula $Na_{0.15}Ni_{0.17}Sr_{1.55}PO_{4.295}$ while x-ray diffraction showed the catalyst to have the hydroxyappatite structure with NiO barely detectable. Characteristic lines in the x-ray diffraction pattern for the catalyst are given in Table 1. This material is designated SrP—HA.

TABLE 1

| 2-θ | d(Å) | I/I₀ % | Phase |
|---|---|---|---|
| 10.46 | 8.45 | w | SrP—HA |
| 21.02 | 4.22 | w | SrP—HA |
| 21.94 | 4.05 | w | SrP—HA |
| 24.46 | 3.64 | w | SrP—HA |
| 26.68 | 3.34 | w-m | SrP—HA |
| 27.92 | 3.19 | w-m | SrP—HA |
| 30.62 | 2.92 | vs | SrP—HA |
| 31.76 | 2.82 | m | SrP—HA |
| 32.50 | 2.75 | w | SrP—HA |
| 37.34 | 2.41 | w | NiO |
| 38.38 | 2.34 | w | SrP—HA |
| 40.46 | 2.23 | w | SrP—HA |
| 41.56 | 2.17 | w | SrP—HA |
| 43.36 | 2.09 | w | NiO |
| 44.70 | 2.03 | m | SrP—HA |
| 46.04 | 1.97 | w | SrP—HA |
| 47.00 | 1.93 | m | SrP—HA |
| 48.56 | 1.87 | w | SrP—HA |
| 49.38 | 1.84 | w | SrP—HA |
| 49.90 | 1.83 | m | SrP—HA |

Example 2

Preparation of Na—Ni—Ca—P—O

A 56.25 gram portion of 85% phosphoric acid ($H_3PO_4$) was added to 150 grams of de-ionized water in a glass beaker. The resulting solution was placed in an ice bath. Similarly, 156 grams of NaOH was dissolved in 180 grams of de-ionized water and chilled in an ice bath. While these solutions chilled, a solution was prepared by dissolving 103.5 grams of $Ca(NO_3)_2.4 H_2O$ and 14.0 grams of $Ni(NO_3)_2.6 H_2O$ in 110 de-ionized water. The chilled NaOH solution was slowly added to the $H_3PO_4$ solution with stirring and the resulting mixture was transferred to a 2-l plastic beaker which was placed under a high speed stirrer. With vigorous mixing, the Ca/Ni solution was added to the phosphate solution forming a gelatinous precipitate. The reaction mixture was homogenized for an hour and then transferred to two 1-liter teflon bottles which were thereafter digested at 100° C. for 4 days at autogenous pressure. The solid products were isolated by filtration, washed thoroughly with de-ionized water, and dried at room temperature. The solid was then calcined at 800° C. for 1.5 hours.

Elemental analysis showed the catalyst to have the empirical formula on an anhydrous basis of $Na_{0.15}Ni_{0.17}Ca_{1.60}PO_{4.345}$ while x-ray diffraction pattern showed the catalyst to have the hydroxyappatite structure with a minor NiO impurity. Characteristic lines in the x-ray diffraction pattern for the catalyst are given in Table 2.

TABLE 2

| 2-θ | d(Å) | I/I₀ % | Phase |
|---|---|---|---|
| 10.80 | 8.19 | w | CaP—HA |
| 16.80 | 5.27 | w | CaP—HA |
| 18.77 | 4.72 | w | CaP—HA |
| 21.72 | 4.09 | w | CaP—HA |
| 22.84 | 3.89 | w | CaP—HA |
| 25.84 | 3.45 | m | CaP—HA |
| 28.08 | 3.18 | w | CaP—HA |
| 28.90 | 3.09 | w-m | CaP—HA |
| 31.74 | 2.82 | vs | CaP—HA |
| 32.16 | 2.78 | s-vs | CaP—HA |
| 32.88 | 2.72 | m-s | CaP—HA |
| 34.02 | 2.63 | m | CaP—HA |
| 35.44 | 2.53 | w | CaP—HA |
| 37.20 | 2.41 | w-m | NiO |
| 39.18 | 2.30 | w | CaP—HA |
| 39.76 | 2.27 | m | CaP—HA |
| 41.96 | 2.15 | w | CaP—HA |
| 43.24 | 2.09 | m | NiO |
| 43.84 | 2.06 | w | CaP—HA |
| 46.66 | 1.94 | m | CaP—HA |
| 48.08 | 1.89 | w | CaP—HA |
| 49.44 | 1.84 | m | CaP—HA |
| 50.46 | 1.81 | w-m | CaP—HA |
| 51.24 | 1.78 | w | CaP—HA |
| 52.06 | 1.76 | w | CaP—HA |
| 53.16 | 1.72 | w-m | CaP—HA |

Example 3

Preparation of Ni impregnated Na—Ni—Ca—P—O

A 627 gram portion of de-ionized water was weighed. Some of this water was used to dilute 160 grams of 85% phosphoric acid ($H_3PO_4$) and some was used to dissolve 223 grams of NaOH. These solutions were chilled in an ice bath. The final portion of the water was used to dissolve 164.36 grams of $Ca(NO_3)_2.4 H_2O$. The chilled sodium hydroxide solution was added to the chilled phosphoric acid solution with stirring. The resulting mixture was placed under a high-speed stirrer. The calcium nitrate solution was then added to the sodium phosphate solution with vigorous stirring, forming a gel in the process. After the completion of the addition, the reaction mixture was further homogenized for 20 minutes. The reaction mixture was then transferred to a teflon bottle and digested at 100° C. for 72 hours under autogenous pressure. The solid products were isolated by filtration, washed with de-ionized water, and dried at room temperature. X-ray diffraction showed the calcium phosphate solid to have the hydroxyapitite structure.

A solution was prepared by dissolving 20.32 grams of $Ni(NO_3)_2.6H_2O$ in 200 grams of $H_2O$. A 74 gram portion of the calcium phosphate solid was added to the Ni solution and slurried using a stirrer. The slurry was added to a steam-jacketed rotary evaporator. The mixture was rolled in the evaporator and steam was applied after 15 minutes of rolling until the solid was dry. The resulting Ni-impregnated solid was dried in an oven at 150° C. overnight and then calcined at 800° C. for 1.5 hours.

Elemental analysis showed the solid to have the empirical formula on an anhydrous basis of $Na_{0.18}N_{0.16}Ca_{1.55}PO_{4.13}$. Characteristic lines in the x-ray diffraction pattern for the catalyst are shown in Table 3.

TABLE 3

| 2-θ | d(Å) | I/I₀ % | Phase |
|---|---|---|---|
| 10.74 | 8.23 | w | CaP—HA |
| 16.74 | 5.29 | w | CaP—HA |
| 21.69 | 4.09 | w | CaP—HA |
| 22.81 | 3.89 | w | CaP—HA |
| 25.80 | 3.45 | m | CaP—HA |
| 28.04 | 3.18 | w | CaP—HA |
| 28.86 | 3.09 | w | CaP—HA |
| 31.70 | 2.82 | vs | CaP—HA |
| 32.12 | 2.78 | m | CaP—HA |
| 32.84 | 2.73 | s | CaP—HA |
| 33.62 | 2.66 | w | CaP—HA |
| 34.00 | 2.64 | m | CaP—HA |
| 35.40 | 2.53 | w | CaP—HA |
| 37.18 | 2.42 | w | NiO |
| 39.14 | 2.30 | w | CaP—HA |
| 39.74 | 2.27 | m | CaP—HA |
| 40.93 | 2.20 | w | CaP—HA |
| 41.94 | 2.15 | w | CaP—HA |
| 43.23 | 2.09 | m | NiO |
| 43.78 | 2.07 | w | CaP—HA |
| 46.62 | 1.95 | m | CaP—HA |
| 48.04 | 1.89 | w | CaP—HA |
| 49.42 | 1.84 | m | CaP—HA |
| 50.44 | 1.81 | w | CaP—HA |
| 51.22 | 1.78 | w | CaP—HA |
| 52.02 | 1.76 | w | CaP—HA |
| 53.10 | 1.72 | w | CaP—HA |

TABLE 4

| 2-θ | d(Å) | I/I₀ % | Phase |
|---|---|---|---|
| 10.38 | 8.51 | w | SrP—HA |
| 20.93 | 4.24 | w | SrP—HA |
| 21.86 | 4.06 | w | SrP—HA |
| 24.38 | 3.65 | w | SrP—HA |
| 26.60 | 3.35 | w | SrP—HA |
| 27.84 | 3.20 | w-m | SrP—HA |
| 30.48 | 2.93 | vs | SrP—HA |
| 31.66 | 2.82 | m | SrP—HA |
| 32.38 | 2.76 | w | SrP—HA |
| 32.74 | 2.73 | w | SrP—HA |
| 37.18 | 2.42 | w | NiO |
| 38.30 | 2.35 | w | SrP—HA |
| 40.40 | 2.23 | w | SrP—HA |
| 41.48 | 2.18 | w | SrP—HA |
| 42.85 | 2.11 | w | SrP—HA |
| 43.24 | 2.09 | w | NiO |
| 44.62 | 2.03 | w-m | SrP—HA |
| 45.96 | 1.97 | w | SrP—HA |
| 46.94 | 1.93 | m | SrP—HA |
| 48.48 | 1.88 | w | SrP—HA |
| 49.30 | 1.85 | w | SrP—HA |
| 49.80 | 1.83 | w | SrP—HA |
| 50.05 | 1.82 | w | SrP—HA |

Example 4

Preparation of Ni impregnated Na—Sr—P—O

A 155.6 gram portion of 85% phosphoric acid ($H_3PO_4$) was diluted with 200 grams de-ionized water and chilled in an ice bath. A sodium hydroxide solution was prepared by dissolving 216 grams NaOH in 250 grams de-ionized water and also chilled in an ice bath. The two chilled solutions were mixed together to make a sodium phosphate solution, which was placed in a teflon beaker under a high-speed stirrer. Separately, 142.85 grams of $Sr(NO_3)_2$ was dissolved in 279 grams of de-ionized water. This solution was added to the sodium phosphate solution with vigorous stirring, forming a gel in the process. An additional 250 grams of de-ionized water was added to reduce the thickness of the mixture. The mixture was homogenized for 1 hour. The reaction mixture was then transferred to 2 1-liter teflon bottles and digested at 100° C. for 2 days at autogenous pressure. The solid products were isolated by filtration, washed with de-ionized water and dried at room temperature. X-ray diffraction showed the strontium phosphate product to have the hydroxyapatite structure.

A solution was prepared by dissolving 19.98 grams of $Ni(NO_3)_2.6H_2O$ in 200 grams of water. A 111 gram portion of the strontium phosphate solid was added to the nickel nitrate solution and slurried using a stirrer. The slurry was added to a steam-jacketed rotary evaporator. The mixture was rolled in the evaporator and steam was applied after 15 minutes of rolling until the solid was dry. The resulting Ni-impregnated solid was dried in an oven at 150° C. overnight and then calcined at 800° C. for 1.5 hours.

Elemental analysis showed the solid to have the empirical formula on an anhydrous basis of $Na_{0.17}Ni0.17Sr_{1.54}PO_{4.295}$. Analysis by x-ray diffraction showed the catalyst to consist of Hydroxyapatite and NiO components. Characteristic lines in the x-ray diffraction pattern for the catalyst are given in Table 4.

Example 5

Preparation of Cs—Na—Sr—Ca—P—O Crystalline Metal Oxide

In a beaker, 21.44 g $Na_2HPO_4.7H_2O$ was dissolved in 148 g de-ionized water. To this solution 31.93 g CsOH (50%) was added and the mixture was placed under a heidolph mixer. Separately, 7.5 g $Sr(NO_3)_2$, 8.37 g $Ca(NO_3)_2.4H_2O$, and 2.29 g $Ni(NO_3)_2.6H_2O$ were dissolved in 25.0 g de-ionized water. The metal nitrate solution was then added to the phosphate solution with vigorous mixing. The resulting mixture thickened, but became less viscous with further stirring. The homogenization was continued for 2 hrs. The reaction mixture was then placed in a teflon bottle and digested at 100° C. at autogenous pressure for 48 hrs. The solid products were isolated by filtration, washed with de-ionized water, and dried at room temperature. The dried solid was calcined for 5 hr at 800° C. before testing.

Elemental analysis on the calcined solid yielded an empirical formula on an anhydrous basis of $Cs_{0.002}Na_{0.164}Ni_{0.076}Sr_{0.755}Ca_{0.757}PO_{4.253}$. Analysis of the catalyst by x-ray diffraction showed it to consist of a mixture of hydroxyapatite, designated CaSrP—HA, a minor component of a new material designated SrCaP-1, which is presented in Example 8, and a minor NiO component. Characteristic lines in the x-ray diffraction pattern for the crystalline metal oxide are given in Table 5.

TABLE 5

| 2-θ | d(Å) | I/I₀ % | Phase |
|---|---|---|---|
| 10.66 | 8.29 | w | CaSrP—HA |
| 13.29 | 6.65 | w | SrCaP-1 |
| 16.62 | 5.33 | w | SrCaP-1 |
| 21.42 | 4.14 | w | CaSrP—HA |
| 25.18 | 3.53 | w-m | CaSrP—HA |
| 25.90 | 3.44 | w | SrCaP-1 |
| 27.40 | 3.25 | w | CaSrP—HA |
| 28.46 | 3.13 | w | CaSrP—HA |
| 29.01 | 3.08 | w | SrCaP-1 |
| 30.19 | 2.96 | w | SrCaP-1 |
| 31.18 | 2.87 | s | CaSrP—HA |

TABLE 5-continued

| 2-θ | d(Å) | I/I₀ % | Phase |
|---|---|---|---|
| 31.44 | 2.84 | vs | CaSrP—HA |
| 32.34 | 2.77 | m | CaSrP—HA |
| 33.26 | 2.69 | w | SrCaP-1 |
| 33.58 | 2.67 | w | SrCaP-1 |
| 34.65 | 2.59 | w | CaSrP—HA |
| 37.34 | 2.41 | w | NiO |
| 39.14 | 2.30 | w | CaSrP—HA |
| 40.62 | 2.22 | w | CaSrP—HA |
| 41.19 | 2.19 | w | CaSrP—HA |
| 42.72 | 2.11 | w | CaSrP—HA |
| 43.50 | 2.08 | w | CaSrP—HA |
| 45.72 | 1.98 | w-m | CaSrP—HA |
| 47.12 | 1.93 | w | CaSrP—HA |
| 48.22 | 1.89 | m | CaSrP—HA |
| 49.52 | 1.84 | w | CaSrP—HA |
| 50.30 | 1.81 | w | CaSrP—HA |
| 50.98 | 1.79 | w | CaSrP—HA |
| 51.64 | 1.77 | w | CaSrP—HA |

Example 6

Preparation of Na—Ni—La—Sr—P—O

In a glass beaker, 46.12 g H$_3$PO$_4$ (98%) was diluted with 300 g de-ionized water and separately 65.95 g NaOH was dissolved in 300 g de-ionized in a similar beaker. Both of these solutions were chilled in ice for an hour before they were carefully mixed. Separately, a metal nitrate solution was prepared as 7.50 g of Ni(NO$_3$)$_2$.6H$_2$O, 31.8 g of Sr(NO$_3$)$_2$, and 21.6 g La(NO$_3$)$_3$ were dissolved in 300 g H$_2$O. The phosphate solution was placed under a high-speed mixer and an additional 300 g de-ionized water was added. Then the nitrate solution was added with stirring. The mixture was homogenized for an hour before it was placed in a teflon bottle and digested at 100° C. at autogenous pressure for 48 hr. The solid products were isolated by filtration, washed with de-ionized water, and dried at room temperature. The dried solid was calcined for 5 hr at 800° C. before testing.

Elemental analysis on the calcined solid yielded an empirical formula on an anhydrous basis of Na$_{0.99}$Ni$_{0.064}$La$_{0.333}$Sr$_{0.995}$PO$_{4.162}$. Analysis of the catalyst by x-ray diffraction showed the major component to have the hydroxyapatite structure, designated LaSr—HA, along with Sr$_3$(PO$_4$)$_2$. NiO was barely detectable in the diffraction pattern. Characteristic lines in the x-ray diffraction pattern for the catalyst are given in Table 6.

TABLE 6

| 2-θ | d(Å) | I/I₀ % | Phase |
|---|---|---|---|
| 19.57 | 4.53 | w | Sr$_3$(PO$_4$)$_2$ |
| 21.06 | 4.22 | w | LaSr—HA |
| 22.07 | 4.03 | w | LaSr—HA |
| 24.64 | 3.61 | w | LaSr—HA |
| 26.24 | 3.39 | w | Sr$_3$(PO$_4$)$_2$ |
| 26.84 | 3.32 | w | LaSr—HA |
| 28.00 | 3.18 | w | LaSr—HA |
| 29.58 | 3.02 | vs | Sr$_3$(PO$_4$)$_2$ |
| 30.64 | 2.92 | vs | LaSr—HA |
| 31.80 | 2.81 | w-m | LaSr—HA |
| 33.34 | 2.69 | s | LaSr—HA |
| 36.12 | 2.49 | w | Sr$_3$(PO$_4$)$_2$ |
| 37.04 | 2.42 | w | Sr$_3$(PO$_4$)$_2$ |
| 38.50 | 2.34 | w | Sr$_3$(PO$_4$)$_2$ |
| 39.00 | 2.31 | w | LaSr—HA |
| 39.84 | 2.26 | w | Sr$_3$(PO$_4$)$_2$ |
| 40.94 | 2.20 | w | Sr$_3$(PO$_4$)$_2$ |
| 41.86 | 2.16 | w | Sr$_3$(PO$_4$)$_2$ |
| 42.98 | 2.10 | m | LaSr—HA |
| 43.42 | 2.08 | m | Sr$_3$(PO$_4$)$_2$ |
| 44.88 | 2.02 | m | Sr$_3$(PO$_4$)$_2$ |
| 45.18 | 2.01 | m | LaSr—HA |
| 46.20 | 1.96 | w | Sr$_3$(PO$_4$)$_2$ |
| 47.28 | 1.92 | m | LaSr—HA |
| 48.74 | 1.87 | w | LaSr—HA |
| 49.62 | 1.84 | w-m | LaSr—HA |
| 49.98 | 1.82 | m | Sr$_3$(PO$_4$)$_2$ |

Example 7

Preparation of Na—Sr—Ni—P—O

In a beaker, a phosphoric acid (85%), 57.65 g, was diluted with 220 g de-ionized water. Similarly, 82.50 g NaOH was dissolved in 220 g de-ionized water. Both of these solutions were chilled for an hour in ice. A metal nitrate solution was prepared by dissolving 14.54 g Ni(NO$_3$)$_2$.6H$_2$O and 14.3 g Sr(NO$_3$)$_2$ in 100 g de-ionized water. The phosphate solution was placed under a high-speed mixer and the NaOH solution was carefully added. This was followed by the addition of the metal nitrate solution. The reaction mixture was homogenized further for an hour before it was placed in a teflon bottle and digested at 100° C. for 48 hr at autogenous pressure. The solid products were isolated by filtration, washed with de-ionized water, and dried at room temperature. The dried solid was calcined for 5 hr at 800° C. before testing.

Elemental analysis on the calcined solid yielded an empirical formula on an anhydrous basis of Na$_{0.105}$Sr$_{1.52}$Ni$_{0.35}$PO$_{4.423}$. Analysis by x-ray diffraction showed the major catalyst component to have the hydroxyapatite structure while Sr$_3$(PO$_4$)$_2$ and NiO were also observed. Characteristic lines in the x-ray diffraction pattern for the catalyst are shown in Table 7.

TABLE 7

| 2-θ | d(Å) | I/I₀ % | Phase |
|---|---|---|---|
| 10.39 | 8.51 | w | SrP—HA |
| 19.48 | 4.55 | w | Sr$_3$(PO$_4$)$_2$ |
| 20.94 | 4.24 | w | SrP—HA |
| 21.86 | 4.06 | w | SrP—HA |
| 24.38 | 3.65 | w | SrP—HA |
| 26.19 | 3.40 | w | Sr$_3$(PO$_4$)$_2$ |
| 26.60 | 3.35 | w-m | SrP—HA |
| 27.84 | 3.20 | w-m | Sr$_3$(PO$_4$)$_2$ |
| 29.52 | 3.02 | m | SrP—HA |
| 30.50 | 2.93 | vs | SrP—HA |
| 31.68 | 2.82 | m | SrP—HA |
| 32.38 | 2.76 | w | SrP—HA |
| 33.16 | 2.70 | m | Sr$_3$(PO$_4$)$_2$ |
| 37.18 | 2.42 | w | NiO |
| 38.30 | 2.35 | w | SrP—HA |
| 39.61 | 2.27 | w | Sr$_3$(PO$_4$)$_2$ |
| 40.36 | 2.23 | w | SrP—HA |
| 40.98 | 2.20 | w | Sr$_3$(PO$_4$)$_2$ |
| 41.46 | 2.18 | w | SrP—HA |
| 42.72 | 2.11 | w | Sr$_3$(PO$_4$)$_2$ |
| 43.24 | 2.09 | w | NiO |
| 44.62 | 2.03 | m | SrP—HA |
| 45.00 | 2.01 | w | Sr$_3$(PO$_4$)$_2$ |
| 45.96 | 1.97 | w | SrP—HA |
| 46.92 | 1.93 | m | SrP—HA |

TABLE 7-continued

| 2-θ | d(Å) | I/I₀ % | Phase |
|---|---|---|---|
| 48.47 | 1.88 | m | SrP—HA |
| 49.30 | 1.85 | m | SrP—HA |
| 49.83 | 1.83 | s | SrP—HA |

Example 8

Preparation of Na—Ni—Ca—Sr—P—O

Sodium hydroxide pellets, 13.74 g, were dissolved in 602 g de-ionized water. To this solution $Na_2HPO_4.7H_2O$, 88.67 g, was added, which dissolved easily. Separately, a metal nitrate solution was prepared by dissolving $Sr(NO_3)_2$, 35.0 g, $Ca(NO_3)_2.4H_2O$, 39.06 g, and $Ni(NO_3)_2.6H_2O$, 10.69 g in 100.0 g de-ionized water. Using vigorous stirring, the metal nitrate solution was added to the phosphate solution. The reaction mixture was homogenized for an hour before it was placed in a teflon bottle and digested at 95° C. for 48 hr at autogenous pressure. The solid products were isolated by filtration, washed with de-ionized water, and dried at room temperature. The dried solid was calcined for 5 hr at 800° C. before testing.

Elemental analysis on the calcined solid yielded an empirical formula on an anhydrous basis of $Na_{0.12}Ni_{0.14}Ca_{0.71}Sr_{0.71}PO_{4.12}$. The x-ray diffraction data indicated the catalyst to contain a new structure designated here as SrCaP-1, which indexed on a hexagonal unit cell with lattice parameters a=10.614 Å and c=19.147 Å. Characteristic lines in the x-ray diffraction pattern for the catalyst are given in table 8. A small amount of NiO was also detectable in the pattern.

TABLE 8

| 2-θ | d(Å) | I/I₀ % | Phase |
|---|---|---|---|
| 10.68 | 8.28 | w | SrCaP-1 |
| 13.32 | 6.64 | w | SrCaP-1 |
| 13.88 | 6.38 | w | SrCaP-1 |
| 16.68 | 5.31 | m | SrCaP-1 |
| 20.91 | 4.25 | w | SrCaP-1 |
| 21.44 | 4.14 | w | SrCaP-1 |
| 25.19 | 3.53 | m | SrCaP-1 |
| 26.06 | 3.42 | w-m | SrCaP-1 |
| 26.87 | 3.32 | w | SrCaP-1 |
| 27.30 | 3.26 | m | SrCaP-1 |
| 29.12 | 3.06 | m | SrCaP-1 |
| 30.36 | 2.94 | vs | SrCaP-1 |
| 31.80 | 2.81 | m | SrCaP-1 |
| 32.35 | 2.77 | w | SrCaP-1 |
| 33.76 | 2.65 | s | SrCaP-1 |
| 34.82 | 2.57 | w | SrCaP-1 |
| 36.66 | 2.45 | w | SrCaP-1 |
| 37.22 | 2.41 | w | NiO |
| 38.81 | 2.32 | w | SrCaP-1 |
| 40.34 | 2.23 | w | SrCaP-1 |
| 40.82 | 2.21 | w | SrCaP-1 |
| 42.01 | 2.15 | w | SrCaP-1 |
| 42.50 | 2.13 | w | SrCaP-1 |
| 43.20 | 2.09 | w | NiO |
| 43.68 | 2.07 | w-m | SrCaP-1 |
| 43.94 | 2.06 | w | SrCaP-1 |
| 44.36 | 2.04 | w | SrCaP-1 |
| 46.00 | 1.97 | m | SrCaP-1 |
| 47.04 | 1.93 | m | SrCaP-1 |
| 47.46 | 1.91 | w | SrCaP-1 |
| 48.52 | 1.87 | w | SrCaP-1 |

TABLE 8-continued

| 2-θ | d(Å) | I/I₀ % | Phase |
|---|---|---|---|
| 49.31 | 1.85 | w | SrCaP-1 |
| 49.78 | 1.83 | w | SrCaP-1 |

Example 9

Preparation of Na—Ni—Ca—P—O

Phosphoric acid (85%), 230.6 g, was diluted with 140 g de-ionized water and chilled in an ice bath. Similarly, sodium hydroxide pellets, 330.0 g, were dissolved in 1860 g de-ionized water and chilled in an ice bath. Separately, 236.15 g $Ca(NO_3)_2.4H_2O$ and $Ni(NO_3)_2.6H_2O$, 32.31 g, were dissolved in 500 g de-ionized water. The chilled phosphoric acid solution was then added carefully to the sodium hydroxide solution, and another 1500 g de-ionized water was added with vigorous mixing. The resulting slurry was transferred to a 5-liter flask. The slurry was heated to 35° C. at which time it was fully dissolved. At this point the metal nitrate solution was added over a period of about 2 minutes. The flask was fitted with a temperature controller, condenser, and a mechanical stirrer. The reaction mixture was heated at 100° C. for 60 hr. The solid products were isolated by filtration, washed with de-ionized water, and dried at room temperature. The dried solid was calcined for 5 hr at 800° C. before testing.

Elemental analysis on the calcined solid yielded an empirical formula on an anhydrous basis of $Na_{0.112}Ni_{0.175}Ca_{1.64}PO_{4.37}$. Analysis by x-ray diffraction showed the catalyst to have the hydroxyapatite structure, designated CaP—HA. A minor NiO component was also observed. Characteristic lines in the x-ray diffraction pattern for the catalyst are given in Table 9.

TABLE 9

| 2-θ | d(Å) | I/I₀ % | Phase |
|---|---|---|---|
| 10.80 | 8.19 | w | CaP—HA |
| 16.82 | 5.27 | w | CaP—HA |
| 21.72 | 4.09 | w | CaP—HA |
| 22.78 | 3.90 | w | CaP—HA |
| 25.80 | 3.45 | m | CaP—HA |
| 28.06 | 3.18 | w | CaP—HA |
| 28.90 | 3.09 | w | CaP—HA |
| 31.72 | 2.82 | vs | CaP—HA |
| 32.12 | 2.78 | s | CaP—HA |
| 32.88 | 2.72 | m | CaP—HA |
| 33.98 | 2.64 | m | CaP—HA |
| 35.46 | 2.53 | w | CaP—HA |
| 37.29 | 2.41 | w | NiO |
| 39.28 | 2.29 | w | CaP—HA |
| 39.80 | 2.26 | w-m | CaP—HA |
| 42.04 | 2.15 | w | CaP—HA |
| 43.13 | 2.10 | w | NiO |
| 43.74 | 2.07 | w | CaP—HA |
| 46.68 | 1.94 | m | CaP—HA |
| 48.06 | 1.89 | w | CaP—HA |
| 49.40 | 1.84 | m | CaP—HA |

Example 10

Preparation of Na—Ni—Sr—P—O

A sodium hydroxide solution was prepared by dissolving 330.0 g NaOH pellets in 1000 g de-ionized water and was subsequently chilled in an ice bath. Similarly, phosphoric acid (85%), 230.6 g, was diluted with 400.0 g de-ionized water. A metal nitrate solution was prepared by dissolving Sr(NO$_3$)$_2$, 211.63 g, and 32.31 g Ni(NO$_3$)$_2$.6 H$_2$O in 600 g de-ionized water. The chilled sodium hydroxide solution was added to a 5 liter flask, followed by the addition of the phosphoric acid with stirring. Another 1000 g of water was added to the resulting suspension and it was heated to 50° C. to achieve dissolution. At this stage the metal nitrate solution was added with stirring. The flask was then equipped with a condenser and a temperature controller. With vigorous stirring, the reaction mixture was digested for 60 hours at 100° C. The solid products were isolated by filtration, washed with de-ionized water, and dried at room temperature. The dried solid was calcined for 5 hr, at 800° C. before testing.

Elemental analysis on the calcined solid yielded an empirical formula on an anhydrous basis of Na$_{0.098}$Ni$_{0.169}$Sr$_{1.518}$PO$_{4.236}$. Analysis by x-ray diffraction showed the catalyst to consist of a single phase designated SrNiP—HA, which has the hydroxyapatite structure. Characteristic lines in the x-ray diffraction pattern for the catalyst are given in Table 10.

TABLE 10

| 2-θ | d(Å) | I/I$_0$ % | Phase |
|---|---|---|---|
| 10.44 | 8.47 | w | SrNiP—HA |
| 21.04 | 4.22 | w | SrNiP—HA |
| 21.92 | 4.06 | w | SrNiP—HA |
| 24.46 | 3.64 | w | SrNiP—HA |
| 26.70 | 3.34 | w-m | SrNiP—HA |
| 27.92 | 3.19 | w-m | SrNiP—HA |
| 30.60 | 2.92 | vs | SrNiP—HA |
| 31.78 | 2.81 | m | SrNiP—HA |
| 32.46 | 2.76 | w | SrNiP—HA |
| 38.38 | 2.34 | w | SrNiP—HA |
| 40.42 | 2.23 | w | SrNiP—HA |
| 41.54 | 2.17 | w | SrNiP—HA |
| 42.90 | 2.11 | w | SrNiP—HA |
| 44.68 | 2.03 | m | SrNiP—HA |
| 46.04 | 1.97 | w | SrNiP—HA |
| 47.04 | 1.93 | m | SrNiP—HA |
| 48.60 | 1.87 | w | SrNiP—HA |
| 49.36 | 1.84 | w | SrNiP—HA |
| 50.02 | 1.82 | m | SrNiP—HA |

Examples 11–17

Catalyst Coking Studies

To investigate the relative coking tendencies of the catalyst compositions of the present invention, samples of the catalyst preparations described in Examples 1, 2, 4, 6, and 8 were tested in a methane partial oxidation environment. Their performance in terms of coke formation rate as well as conversion and selectivity were compared to conventional partial oxidation catalysts comprising nickel on an alumina support (Example 16) and further comprising a magnesium oxide promoter (Example 17).

The testing procedure involved loading a 2.4 gram catalyst sample, which had been screened to a 40–60 mesh particle size range, into a quartz reactor. The reactor was heated to 800° C. under a nitrogen purge at atmospheric pressure. At 800° C., the nitrogen purge was stopped and a combined stream of methane (Matheson, 99.99% pure) and air (Matheson) was introduced to the catalyst bed. Based on the flow rates of these feed components for the partial oxidation reaction, the carbon to oxygen atom ratio (equivalent to ½ of the carbon/O$_2$ ratio) ranged from 1.04 to 1.09 and the gas hourly space velocity (GHSV) ranged from 17,000 to 23,000 hr$^{-1}$ in these examples. Each test continued under constant conditions for 48 hours. During this time, the average methane conversion (except in Example 15) varied from 86–89%, with a molar selectivity to CO and H$_2$ partial oxidation products in excess of 97%. In Example 15, the methane conversion was 75% with molar selectivities to CO and H$_2$ of 87% and 93%, respectively. Analyses of gaseous products exiting the reactor were performed on-line using Gas Chromatography. Also, the spent catalyst after each test was analyzed to determine its carbon content, and these results are summarized in Table 11:

TABLE 11

| Example | Catalyst | C/O Atom ratio | Spent Catalyst Coke, wt-% |
|---|---|---|---|
| 11 | Na—Ni—Sr—P—O (from Example 1) | 1.09 | 1.1 |
| 12 | Na—Ni—Ca—P—O (from Example 2) | 1.09 | 0.4 |
| 13 | Ni impregnated Na—Sr—P—O (from Example 4) | 1.05 | 0.82 |
| 14 | Na—Ni—La—Sr—P—O (from Example 6) | 1.08 | 0.1 |
| 15 | Na—Ni—Ca—Sr—P—O (from Example 8) | 1.04 | 0.77 |
| 16 | Commercial Ni/Al$_2$O$_3$ | 1.08 | 23.2 |
| 17 | Commercial Ni/Al$_2$O$_3$—MgO promoted | 1.05 | 9.0 |

Figure 1:
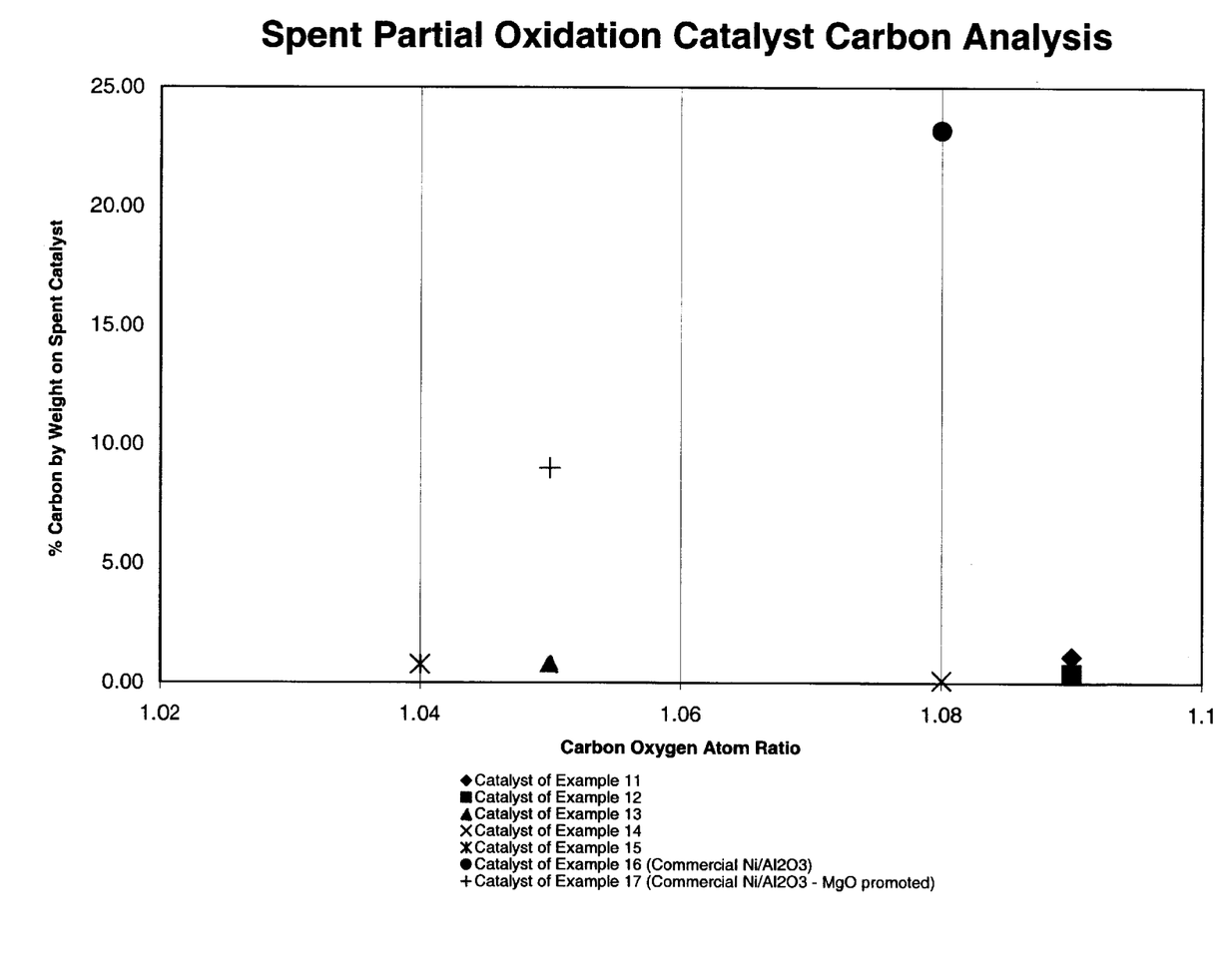

The results of this study showed that catalyst compositions within the scope of the present invention (Examples 11–15) performed equivalently to conventional partial oxidation catalysts in terms of conversion and molar selectivity value. However, these catalysts had surprisingly reduced rates of coke formation. This conclusion is clearly supported by the accompanying FIGURE. The exceptional characteristics of catalysts of the present invention allow, in commercial operation, for extended operation or operation under more severe conditions (e.g. at an increased C/O atom ratio) that provide a higher quality syngas product.

What is claimed is:

1. A catalyst composition for the production of synthesis gas from light hydrocarbons, the catalyst composition comprising a crystalline metal oxide component having a chemical composition on an anhydrous basis expressed by an empirical formula of:

$$A_v(B^{t+})_w Ni_x D(G^{u-})_y O_z$$

where A is an alkali metal selected from the group consisting of Li$^+$, Na$^+$, K$^+$, Rb$^+$, Cs$^+$, and mixtures thereof, "v" is the mole ratio of A to D and varies from 0 to about 2, B is a basic metal, "w" is the mole ratio of B to D and varies from about 1 to about 3, "t" is the weighted average valence of B and varies from 2 to about 3, "x" is the mole ratio of Ni to D and varies from 0 to about 0.5, D is a framework component selected from the group consisting of P$^{+5}$, V$^{+5}$, and mixtures thereof, and G is an anionic species selected from the group consisting of OH$^-$, Cl$^-$, F$^-$, CO$_3^{2-}$, and mixtures thereof, "u" is the average valence of G and varies from 1 to about 2, "y" is the mole ratio of G to D and varies from 0 to about 2, "z" is the mole ratio of O to D and has a value determined by the equation:

$$z=\tfrac{1}{2}(v+t\cdot w+2\cdot x+5-u\cdot y),$$

and when B is Ca, "v" is not 0, and when "x" is 0, the catalyst composition further comprises a nickel component dispersed on the crystalline metal oxide component.

2. The catalyst composition of claim 1 where B is selected from the group consisting of $Ca^{2+}$, $Sr^{2+}$, $Pb^{2+}$, $Cd^{2+}$, $Ba^{2+}$, $La^{3+}$, $Eu^{3+}$, $Gd^{3+}$, $Pr^{3+}$, $Nd^{3+}$, $Sm^{3+}$, $Y^{3+}$, $Yb^{3+}$, and mixtures thereof.

3. The catalyst composition of claim 2 where B comprises a mixture of Sr and a second metal selected from the group consisting of $Ca^{2+}$, $Ba^{2+}$, $La^{3+}$, $Eu^{3+}$, $Gd^{3+}$, $Pr^{3+}$, $Nd^{3+}$, $Sm^{3+}$, $Y^{3+}$, $Yb^{3+}$, and mixtures thereof.

4. The catalyst composition of claim 1 where the crystalline metal oxide component has the apatite or hydroxyapatite crystal structure.

5. The catalyst composition of claim 1 further comprising, when "x" is greater than 0, a nickel component dispersed on the crystalline metal oxide component.

6. A process for preparing a catalyst composition comprising a crystalline metal oxide component having a chemical composition on an anhydrous basis expressed by an empirical formula of:

$$A_v(B^{t+})_w Ni_x D(G^{u-})_y O_z$$

where A is an alkali metal selected from the group consisting of $Li^+$, $Na^+$, $K^+$, $Rb^+$, $Cs^+$, and mixtures thereof, "v" is the mole ratio of A to D and varies from 0 to about 2, B is a basic metal, "w" is the mole ratio of B to D and varies from about 1 to about 3, "t" is the weighted average valence of B and varies from 2 to about 3, "x" is the mole ratio of Ni to D and varies from 0 to about 0.5, D is a framework component selected from the group consisting of $P^{+5}$, $V^{+5}$, and mixtures thereof, and G is an anionic species selected from the group consisting of $OH^-$, $Cl^-$, $F^-$, $CO_3^{2-}$, and mixtures thereof, "u" is the average valence of G and varies from 1 to about 2, "y" is the mole ratio of G to D and varies from 0 to about 2, and "z" is the mole ratio of O to D and has a value determined by the equation:

$$z=\tfrac{1}{2}(v+t \cdot w+2 \cdot x+5-u \cdot y),$$

and when B is Ca, "v" is not 0, and when x is 0, the catalyst composition further comprises a nickel component dispersed on the crystalline metal oxide component, the process comprising:

a) reacting a mixture containing reactive sources of B, optionally Ni, D, and optionally A, at a pH from about 8 to about 14 and a temperature and time sufficient to form the crystalline metal oxide component, the mixture having a composition expressed by:

$$hA_2O:jBO_{t/2}:kNiO:D_2O_5:lN:mH_2O$$

where N is a mineralizer, "h" varies from 0 to about 10, "j" varies from about 0.10 to about 6.0, "k" varies from 0 to about 1.0, "l" varies from 0 to about 20, and "m" varies from about 40 to about 500, b) contacting, when "k" is 0, the crystalline metal oxide component with an aqueous solution of a nickel salt selected from the group consisting of nickel nitrate, nickel chloride, nickel bromide, nickel acetate, and mixtures thereof, and c) calcining the crystalline metal oxide component of step (a) or (b) at a temperature from about 600° C. to about 1000° C. for a period from about 1 to about 10 hours to yield the catalyst.

7. The process of claim 6 further comprising carrying out step (b) when "k" is greater than 0.

8. The process of claim 6 where the temperature is from about 50° C. to about 150° C. and the time is from about 12 to about 96 hours.

9. The process of claim 6 where the D framework component is phosphorous and the reactive source is selected from the group consisting of orthophosphoric acid, pyrophosphoric acid, alkali phosphates, sodium metaphosphate and mixtures thereof.

10. A process for producing synthesis gas comprising reacting a light hydrocarbon and an oxidant at reaction conditions in the presence of a catalyst composition comprising a crystalline metal oxide component having a chemical composition on an anhydrous basis expressed by an empirical formula of:

$$A_v B^{t+}_w Ni_x D(G^{u-})_y O_z$$

where A is an alkali metal selected from the group consisting of $Li^+$, $Na^+$, $K^+$, $Rb^+$, $Cs^+$, and mixtures thereof, "v" is the mole ratio of A to D and varies from 0 to about 2, B is a basic metal, "w" is the mole ratio of B to D and varies from about 1 to about 3, "t" is the weighted average valence of B and varies from 2 to about 3, "x" is the mole ratio of Ni to D and varies from 0 to about 0.5, D is a framework component selected from the group consisting of $P^{+5}$, $V^{+5}$, and mixtures thereof, and G is an anionic species selected from the group consisting of $OH^-$, $Cl^-$, $F^-$, $CO_3^{2-}$, and mixtures thereof, "u" is the average valence of G and varies from 1 to about 2, "y" is the mole ratio of G to D and varies from 0 to about 2, and "z" is the mole ratio of O to D and has a value determined by the equation:

$$z=\tfrac{1}{2}(v+t \cdot w+2 \cdot x+5-u \cdot y),$$

and when B is Ca, "v" is not 0, and when "x" is 0, the catalyst composition further comprises a nickel component dispersed on the crystalline metal oxide component.

11. The process of claim 10 where the reaction is selected from the group consisting of partial oxidation, steam reforming, autothermal reforming, and $CO_2$ reforming.

12. The process of claim 10 where the light hydrocarbon is selected from the group consisting of natural gas, methane, ethane, propane, butane, and mixtures thereof.

13. The process of claim 10 where the reaction conditions include a temperature from about 600° C. to about 1200° C., an absolute pressure from about 5 to about 60 atmospheres, and a gas hourly space velocity from about 500 to about 500,000 $hr^{-1}$.

14. The process of claim 10 where the oxidant is selected from the group consisting of oxygen, air, enriched air, steam, carbon dioxide, and mixtures thereof.

15. The process of claim 14 where the oxidant is selected from the group consisting of oxygen, air, and oxygen-enriched air, and the reaction conditions include a carbon to oxygen atom ratio from about 0.5 to about 2.0.

16. The process of claim 14 where the oxidant comprises steam and the reaction conditions include a carbon to steam molar ratio of less than about 2.

17. The process of claim 10 where the crystalline metal oxide component has an apatite or hydroxyapatite crystal structure.

18. The process of claim 10 where, when "x" is greater than 0, the catalyst composition further comprises a nickel component dispersed on the crystalline metal oxide component.

* * * * *